US012747789B2

(12) United States Patent
Ogata et al.

(10) Patent No.: US 12,747,789 B2
(45) Date of Patent: Sep. 29, 2026

(54) GASKET

(71) Applicant: NOK CORPORATION, Tokyo (JP)

(72) Inventors: Chiyota Ogata, Kumamoto (JP); Tasuku Ono, Kumamoto (JP); Shinji Ushijima, Kumamoto (JP); Yohei Miki, Kumamoto (JP); Kodai Matsumoto, Kumamoto (JP)

(73) Assignee: NOK CORPORATION, Tokyo (JP)

( * ) Notice: Subject to any disclaimer, the term of this patent is extended or adjusted under 35 U.S.C. 154(b) by 91 days.

(21) Appl. No.: 18/695,657

(22) PCT Filed: Aug. 30, 2022

(86) PCT No.: PCT/JP2022/032518
§ 371 (c)(1),
(2) Date: Nov. 22, 2024

(87) PCT Pub. No.: WO2023/047896
PCT Pub. Date: Mar. 30, 2023

(65) Prior Publication Data

US 2025/0122936 A1 Apr. 17, 2025

(30) Foreign Application Priority Data

Sep. 27, 2021 (JP) ................................ 2021-157050

(51) Int. Cl.
*F16J 15/06* (2006.01)

(52) U.S. Cl.
CPC ........... *F16J 15/061* (2013.01); *F16J 15/062* (2013.01)

(58) Field of Classification Search
CPC ............................... F16J 15/061; F16J 15/062
See application file for complete search history.

(56) References Cited

U.S. PATENT DOCUMENTS

| | | | | |
|---|---|---|---|---|
| 2004/0000763 A1* | 1/2004 | Gernand | ................ | F16J 15/061 277/630 |
| 2004/0056429 A1* | 3/2004 | Okazaki | ................ | F16J 15/061 277/627 |

(Continued)

FOREIGN PATENT DOCUMENTS

| | | |
|---|---|---|
| EP | 3 168 508 | 5/2017 |
| JP | 7-18068 | 3/1995 |

(Continued)

OTHER PUBLICATIONS

Japan, Notice of Reasons for Refusal received in JP Application No. 2023-549436, dated May 7, 2025 and English language translation thereof.

(Continued)

*Primary Examiner* — Eugene G Byrd
(74) *Attorney, Agent, or Firm* — GREENBLUM & BERNSTEIN, P.L.C.

(57) ABSTRACT

A gasket (1) includes a body portion (10) in an annular shape having a basal surface (11) to contact a bottom surface (113) of a groove(110) and a top surface (12) to contact a second member (200) and extending over an entire circumferential direction of the gasket (1), a first protrusion pair (20) protruding from the body portion (10) respectively toward both side surfaces (111, 112) of the groove (110) and extending over the entire circumferential direction; and a second protrusion pair (30) protruding from the first protrusion pair (20) respectively toward both the side surfaces (111, 112). Respective second protrusions (31, 32) of the second protrusion pair (30) are disposed at a same position in the circumferential direction, and tip ends (31*f*, 32*f*) of the respective second protrusions (31, 32) are formed in a planar shape to be along the side surfaces of the groove (110). A first gasket width (W1) of the gasket (1) is smaller than a (Continued)

groove width (W0), and a second gasket width (W2) is larger than the groove width (W0).

8 Claims, 10 Drawing Sheets

(56) References Cited

U.S. PATENT DOCUMENTS

| | | | | |
|---|---|---|---|---|
| 2008/0265523 | A1* | 10/2008 | Galpin | F16J 15/061 277/590 |
| 2010/0084827 | A1* | 4/2010 | Peddle | F16J 15/061 277/644 |
| 2010/0140881 | A1 | 6/2010 | Matsuo | |
| 2011/0169228 | A1* | 7/2011 | Karram | F16J 15/061 277/650 |
| 2011/0193298 | A1 | 8/2011 | Yoshitsune et al. | |
| 2017/0138480 | A1* | 5/2017 | Yu | F16J 15/061 |
| 2018/0163868 | A1 | 6/2018 | Ishigami et al. | |
| 2020/0018398 | A1 | 1/2020 | Ono | |

FOREIGN PATENT DOCUMENTS

| | | | |
|---|---|---|---|
| JP | 2002-168351 | 6/2002 | |
| JP | 2002-371913 | 12/2002 | |
| JP | 2007-107546 | 4/2007 | |
| JP | 2010-138957 | 6/2010 | |
| JP | 2012246969 A * | 12/2012 | F16J 15/061 |
| JP | 3191100 | 6/2014 | |
| JP | 2014224589 A * | 12/2014 | F16J 15/062 |
| JP | 2018-96400 | 6/2018 | |
| JP | 2018-204780 | 12/2018 | |
| JP | 2020-8117 | 1/2020 | |
| WO | 2008/140031 | 11/2008 | |
| WO | 2010/047165 | 4/2010 | |

OTHER PUBLICATIONS

International Search Report issued in International Patent Application No. PCT/JP2022/032518, dated Nov. 15, 2022.

Written Opinion issued in International Patent Application No. PCT/JP2022/032518, dated Nov. 15, 2022.

Extended European Search Report issued in EP application No. 22872652.7, dated Aug. 21, 2025.

Japan, Notice of Reasons for Refusal issued in JP application No. 2023-549436 dated Sep. 25, 2025, and English language translation thereof.

Japan, Refusal Decision received in JP application No. 2023-549436, dated Feb. 12, 2026, and English language translation thereof.

China, Office Action received in CN application No. 202280064890.5, dated Jul. 4, 2026, and English language translation.

* cited by examiner

GASKET

CROSS REFERENCE TO RELATED APPLICATIONS

The present application is a U.S. National Stage application of International Patent Application No. PCT/JP2022/032518, filed on Aug. 30, 2022, which claims the benefit of Japanese Patent Application No. 2021-157050, filed on Sep. 27, 2021. The contents of these applications are incorporated herein by reference in their entirety.

BACKGROUND

Technical Field

The present disclosure relates to a gasket.

Background Description of Related Art

Conventionally, as a gasket, for example, a gasket described in Japanese Patent Application Publication No. 2018-096400. The gasket described in Japanese Patent Application Publication No. 2018-096400 is annularly formed so as to seal a gap between a first member in which an annular groove is formed, and a second member to be overlaid on the first member so as to close an opening of the groove of the first member. The gasket includes a first portion extending from an end surface on one side to contact a bottom surface of the groove to an end surface on another side to contact the second member, and a second portion that protrudes toward both side surfaces of the groove from the first portion. The first portion and the second portion extend over a circumferential direction of the gasket. In the gasket described in Japanese Patent Application Publication No. 2018-096400, a width of the gasket in the second portion is the same as a groove width of the groove.

SUMMARY

According to the gasket of Japanese Patent Application Publication No. 2018-096400, the width of the gasket in the second portion is the same as the groove width, and therefore, when the gasket is attached into the groove, the second portion contacts both the side surfaces of the groove. Accordingly, it is possible to restrain the gasket from falling off the groove. However, on the other hand, air in the groove is sealed by the gasket as a result of the second portion contacting both the side surfaces of the groove over the entire circumference. As a result, insertion of the gasket into the groove tends to be hindered by the repulsive force of the sealed air. Accordingly, there has been a desire to further improve attachability of the gasket to the groove in the gasket of Japanese Patent Application Publication No. 2018-096400.

An object of the present disclosure relates to the aforementioned problem.

The present disclosure is a gasket in an annular shape to seal a gap between a first member in which an annular groove is formed and a second member to be overlaid on the first member to close an opening of the groove, and the gasket includes a body portion in an annular shape having a basal surface to contact a bottom surface of the groove and a top surface to contact the second member, and extending over an entire circumferential direction of the gasket, a first protrusion pair protruding from the body portion respectively toward both side surfaces in a radial direction of the groove and extending over the entire circumferential direction, and one or more second protrusion pairs protruding from the first protrusion pair respectively toward both the side surfaces of the groove, and wherein respective protrusions of the second protrusion pair are disposed at a same position in the circumferential direction, tip ends of the respective protrusions are formed in a planar shape to be along the side surfaces of the groove, a first gasket width from a tip end of one protrusion of the first protrusion pair to a tip end of another protrusion is smaller than a groove width between both the side surfaces of the groove, and a second gasket width from a tip end of one protrusion of the second protrusion pair to a tip end of another protrusion is larger than the groove width.

Further, it is preferable that the respective protrusions of the second protrusion pair are provided at a same position in a height direction of the gasket.

Further, the basal surface of the body portion may be formed in a planar shape to be along the bottom surface of the groove, and a length of the tip end of at least one protrusion of the second protrusion pair in a height direction of the gasket may be equal to or larger than a width of the basal surface.

Further, the top surface of the body portion may be formed in a planar shape to be along a surface of the second member that is to abut on the top surface, and a length of the tip end of at least one protrusion of the second protrusion pair in a height direction of the gasket may be equal to or larger than a width of the top surface.

Further, a recessed part recessed to a body portion side may be formed at the tip end of at least one protrusion of the first protrusion pair. In this case, in the width direction of the gasket, a distance from a most recessed portion of the recessed part to the tip end may be equal to or less than 0.5 mm.

Further, in sectional view perpendicular to the circumferential direction of the gasket, at least one protrusion of the first protrusion pair may be formed in a tapered shape that enlarges as progresses toward the body portion.

Effects of Invention

According to the configuration as above, it is possible to provide the gasket that is less likely to fall from the groove, and can improve attachability.

DETAILED DESCRIPTION

Hereinafter, modes for carrying out a gasket according to the present disclosure will be illustrated with the accompanying drawings. Embodiments illustrated below are for ease of understanding of the present disclosure and are not intended to be interpreted as limiting the present disclosure. The present disclosure can be modified and improved from the following embodiments without departing from the gist of the present disclosure. Further, in the accompanying drawings, dimensions of each member may be shown by being exaggerated for ease of understanding.

First Embodiment

A gasket according to the present embodiment is an annular gasket to seal a gap between a first member in which an annular groove is formed, and a second member to be overlaid on the first member so as to close an opening of the groove.

Figure 1:
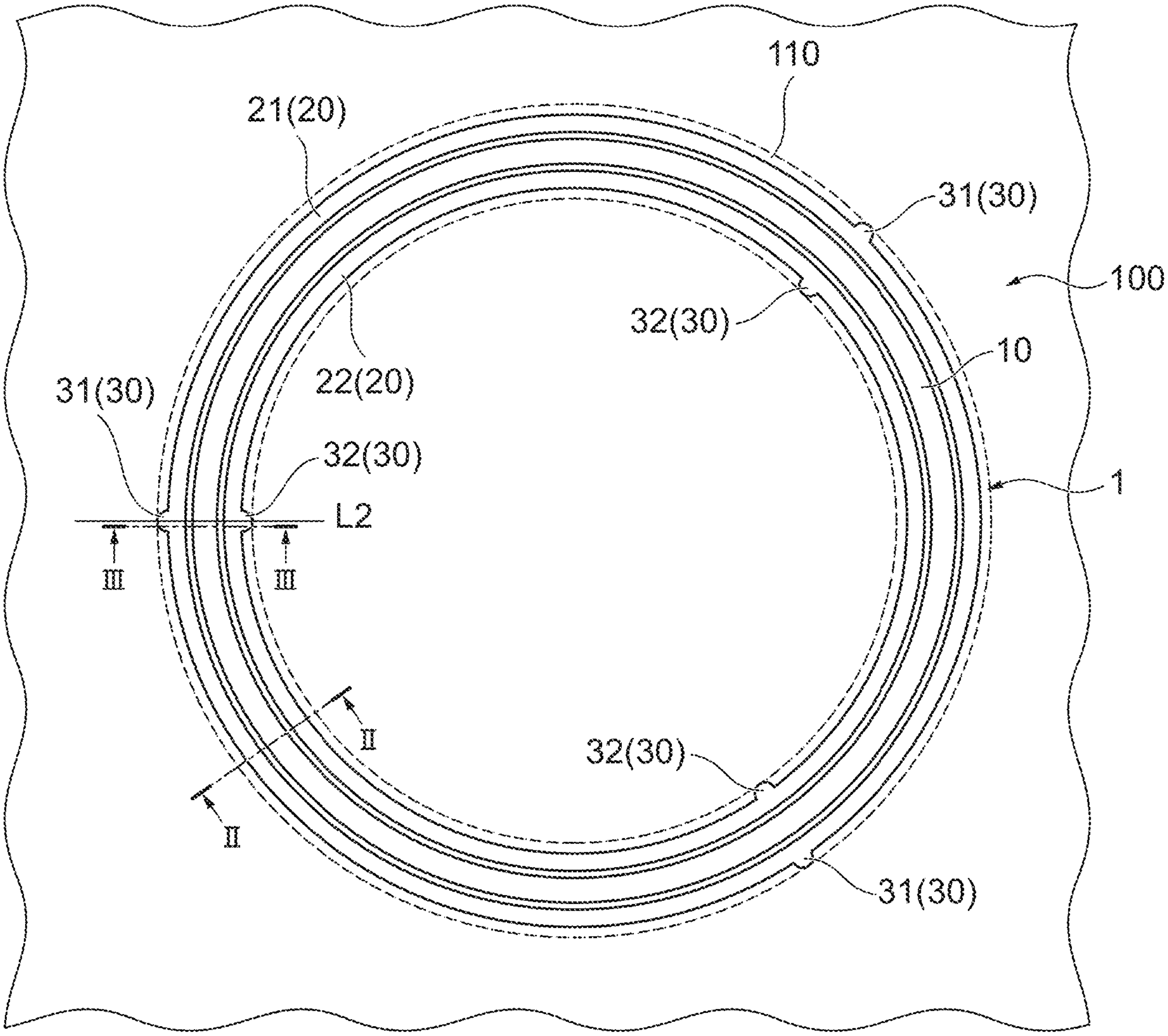
FIG. 1 is a plan view showing a state in which a gasket according to a first embodiment of the present disclosure is attached to a groove of a first member.

FIG. 1 is a plan view showing the gasket to be attached to a head cover of a vehicle engine. Note that in FIG. 1, in order to prevent a gasket 1 from being unclear, the head over as a first member 100 is shown in a broken line. As shown in FIG. 1, a groove 110 is annularly formed in the first member 100. Note that the first member 100 is not limited to the above-described head cover. The gasket 1 is annularly formed so as to be attachable to an entire circumference of the groove 110, and is formed of, for example, a rubber material such as a silicon rubber or a fluorine rubber so as to be elastically deformable. Note that in FIG. 1, the gasket 1 and the groove 110 are expressed as circular, but the gasket 1 and the groove 110 can have annular shapes, and may have, for example, an ellipse, oval, rectangle, square, oblong, trapezoid, other quadrilaterals, polygon, and the like.

Figure 2:
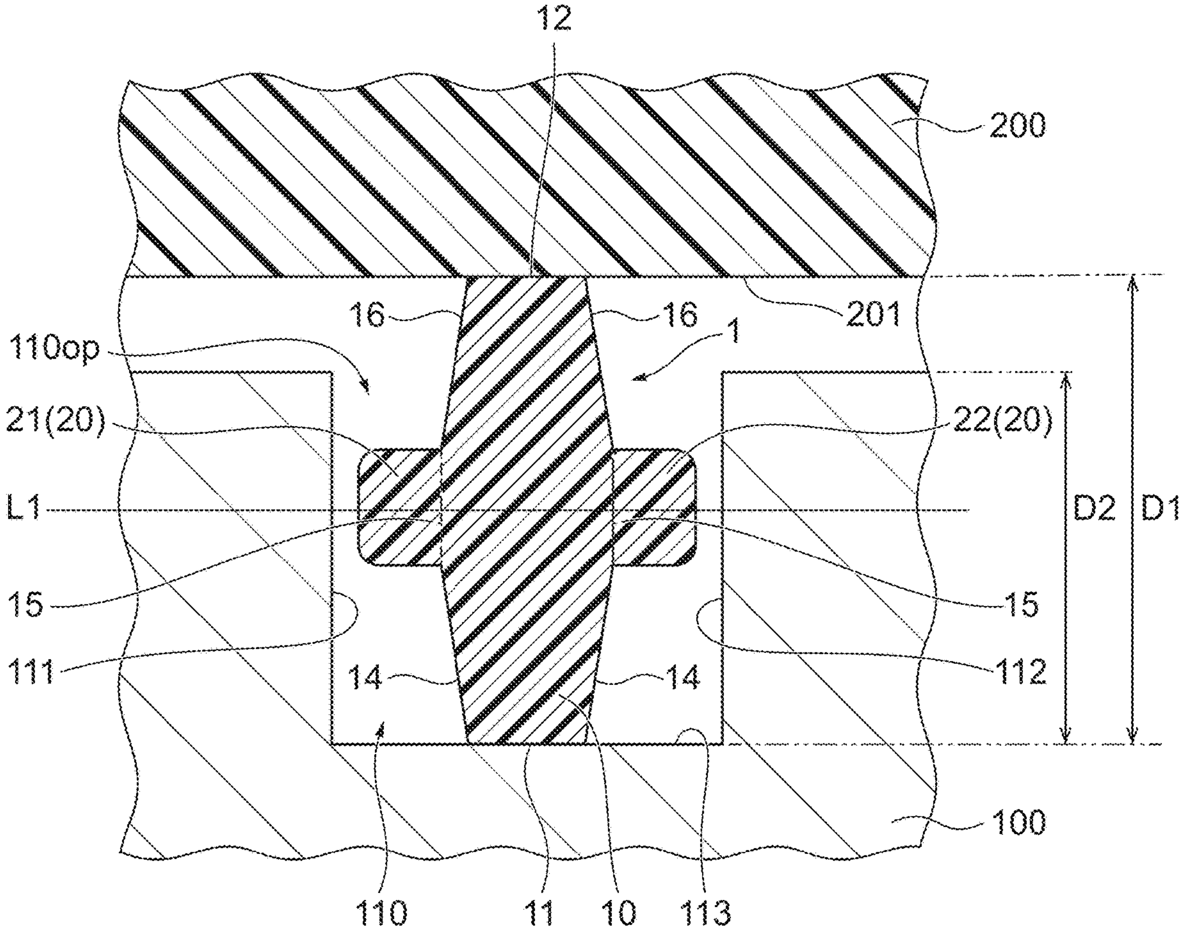
FIG. 2 is a partially cut part end view in line II-II showing the gasket and the first member shown in FIG. 1 with a second member.
Figure 3:
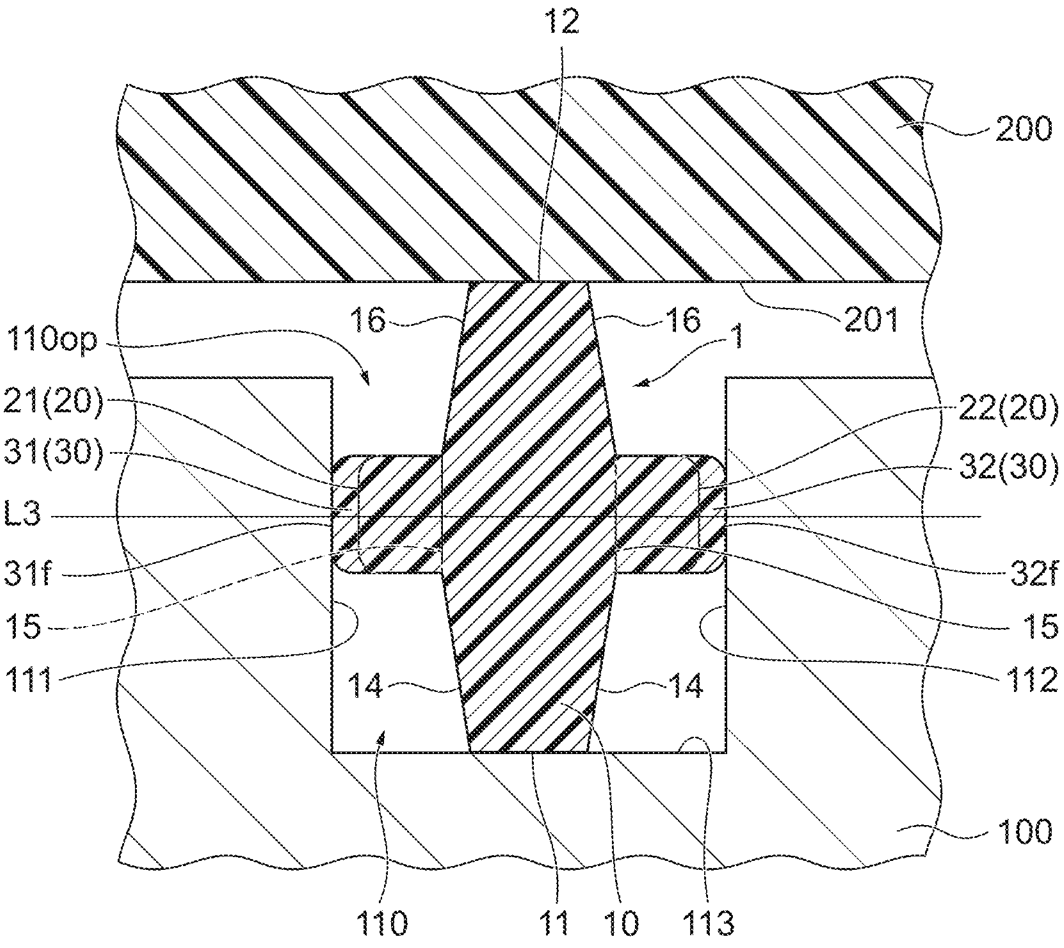
FIG. 3 is a partially cut part end view in III-III line showing the gasket and the first member shown in FIG. 1 with the second member.

FIG. 2 is a partially cut part end view showing the gasket 1 and the first member 100 in line II-II in FIG. 1, and FIG. 3 is a partially cut part end view showing the gasket 1 and the first member 100 in III-III line in FIG. 1. As shown in FIG. 2 and FIG. 3, the groove 110 is generally formed in a rectangle, and is defined by a bottom surface 113, and side surfaces 111 and 112 substantially perpendicular to the bottom surface 113. An opposite side of the bottom surface 113 is an opening 110*op* of the groove 110. The gasket 1 is inserted into the groove 110 from the opening 110*op*. Note that the shape of the groove 110 does not always have to be rectangular. For example, the side surfaces 111 and 112 are formed to be gradually away from the bottom surface 113 as progress toward the opening 110*op* to form the shape of the groove 110 in a trapezoid that gradually enlarges as progresses toward the opening 110*op*.

In FIG. 2 and FIG. 3, a cylinder head of the vehicle engine as the second member 200 is also shown. The second member 200 is overlaid on the first member 100 so as to close the opening 100*op* of the groove 110. Note that the second member 200 is not limited to the above-described cylinder head. Further, in the states shown in FIG. 2 and FIG. 3, the gasket 1 is not substantially pressed by the second member 200, that is, is not substantially deformed elastically.

As shown in FIG. 1 to FIG. 3, the gasket 1 includes a body portion 10, a first protrusion pair 20, and one or more second protrusion pairs 30. The body portion 10, the first protrusion pair 20, and the one or more second protrusion pairs 30 are integrally molded. Further, in the present embodiment, as shown in FIG. 2 and FIG. 3, the gasket 1 is formed so that a section perpendicular to the circumferential direction has a linearly symmetrical shape. Note that the shape of the above-described section of the gasket is not limited to the linearly symmetrical shape.

The body portion 10 is an annular member extending over the entire circumferential direction of the gasket 1. In the present embodiment, the body portion 10 is formed so that a section perpendicular to the circumferential direction is octagonal. Specifically, the body portion 10 includes a basal surface 11 and a top surface 12 that are parallel to each other and have a same width, a pair of basal surface side inclined surfaces 14 that gradually separate from each other as progress toward the top surface 12 side from the basal surface 11, a pair of top surface side inclined surfaces 16 that gradually separate from each other as progress toward a basal surface 11 side from the top surface 12, and a pair of parallel surfaces 15 that connect the pair of basal surface side inclined surfaces 14 and the pair of top surface side inclined surfaces 16 and are parallel to each other. Note that the sectional shape of the body portion 10 is not limited to an octagon, but may be, for example, a rectangle, a trapezoid, other quadrilaterals, a hexagon, other polygons, an oval, or an ellipse.

In the present embodiment, the basal surface 11 may be formed into a planar shape to be along the bottom surface 113 of the groove 110 and parallel to the bottom surface 113. Further, the top surface 12 may be formed into a planar shape to be along a surface 201 on a first member 100 side, of the second member 200, and parallel to the surface 201. Note that the basal surface 11 and the top surface 12 do not necessarily need to have planar shapes, but may have, for example, curved surfaces that protrude as progress toward the bottom surface 113 of the groove 110 and the above-described surface 201 of the second member 200.

The pair of parallel surfaces 15 are shown in alternate long and short dash lines in FIG. 2 and FIG. 3. The pair of parallel surfaces 15 are perpendicular to the basal surface 11 and the top surface 12, and are parallel to both the side surfaces 111 and 112 in a radial direction of the groove 110. The pair of parallel surfaces 15 extend along a depth direction of the groove. A distance between the pair of parallel surfaces 15 forms a maximum width of the body portion 10, and the maximum width of the body portion 10 is smaller than a groove width that is a distance between both the side surfaces 111 and 112. A pair of parallel surfaces 15 are located in a center in a height direction of the gasket 1.

When the gasket 1 is not substantially deformed elastically, a height D1 of the body portion 10 from the basal surface 11 to the top surface 12 is a maximum height of the gasket 1, and is larger than a depth D2 (that is, the depth D2 of the groove 110) of each of the side surface 111 and the side surface 112 of the groove 110.

As shown in FIG. 1 and FIG. 2, the first protrusion pair 20 includes one side first protrusion 21 formed on an outer periphery side of the gasket 1, and another side first protrusion 22 formed on an inner periphery side of the gasket 1. The one side first protrusion 21 protrudes from the parallel surface 15 on one side of the body portion 10 toward the side surface 111 of the groove 110. The other side first protrusion 22 protrudes from the parallel surface 15 on another side of the body portion 10 toward the side surface 112 of the groove 110. Each of the one side first protrusion 21 and the other side first protrusion 22 extends over the entire circumferential direction of the gasket 1. In this way, the first protrusion pair 20 protrude from the body portion 10 toward the outer periphery side and the inner periphery side toward the both the side surfaces 111 and 112 of the groove 110 and extend over the entire circumferential direction.

In the present embodiment, each of the one side first protrusion 21 and the other side first protrusion 22 is located on one arbitrary straight line L1 extending in the width direction in a section parallel to the height direction shown in FIG. 2. In other words, the one side first protrusion 21 and the other side first protrusion 22 are provided at a same position in the height direction. Note that the positions in the height direction of the one side first protrusion 21 and the other side first protrusion 22 may not be the same. In other words, at least one of the one side first protrusion 21 and the other side first protrusion 22 may not be located on the straight line L1, and the one side first protrusion 21 may be at such a position higher or lower than the other side first protrusion 22 that it does not overlap the straight line L1, or vice versa.

In the present embodiment, the one side first protrusion 21 and the other side first protrusion 22 have substantially same sectional shapes and sectional dimensions. Specifically, the respective sectional shapes along the height directions of the one side first protrusion 21 and the other side first protrusion 22 are substantially rectangular, and fillets are formed at both ends of respective tip ends of the first protrusions 21 and 22. However, the fillets are not essential.

As shown in FIG. 1 and FIG. 3, the gasket 1 of the present embodiment has three second protrusion pairs 30. These second protrusion pairs 30 are disposed at approximately regular intervals (that is, intervals of 120°) in the circumferential direction of the gasket 1. In the present embodiment, configurations of the three second protrusion pairs 30 are the same except for positions in the circumferential direction, and therefore, only one of the second protrusion pairs 30 will be described hereinafter.

As shown in FIG. 3, the second protrusion pair 30 includes one side second protrusion 31 formed on the outer periphery side of the gasket 1, and another side second protrusion 32 formed on the inner periphery side of the gasket 1. The one side second protrusion 31 protrudes from the one side first protrusion 21 of the first protrusion pair 20 toward the side surface 111 of the groove 110. The other side second protrusion 32 protrudes from the other side first protrusion 22 of the first protrusion pair 20 toward the side surface 112 of the groove 110. Note that in FIG. 3, in order to show a positional relationship of the first protrusion pair 20 and the second protrusion pair 30, the tip ends of the first protrusion pair 20 are shown in broken lines.

Each of the one side second protrusion 31 and the other side second protrusion 32 are located on one arbitrary straight line L2 extending in a width direction perpendicular to the circumferential direction of the gasket 1 when the gasket 1 is viewed in plan view as in FIG. 1. In other words, the one side second protrusion 31 and the other side second protrusion 32 are disposed in a same position in the circumferential direction of the gasket 1. Note that as long as each of the one side second protrusion 31 and the other side second protrusion 32 is located on the straight line L2, the respective positions in the circumferential direction of the one side second protrusion 31 and the other side second protrusion 32 may shift from each other. In this way, the respective one side second protrusion 31 and other side second protrusion 32 of the second protrusion pair 30 are disposed at the same position in the circumferential direction and protrude toward both the side surfaces 111 and 112 of the groove 110 from the first protrusion pair 20.

Note that when attention is paid to a site where the second protrusion pair 30 is provided, of the gasket 1, in the section parallel to the height direction (see FIG. 3), only one second protrusion pair 30 is provided in the site. According to the configuration like this, it is avoided that the shape of the gasket 1 becomes complicated. Further, even when a mold is opened in the height direction when the gasket 1 is molded, only one second protrusion pair 30 is present in the height direction, so that interference of the protrusion can be avoided, and unreasonable removal can be avoided.

In the present embodiment, the one side second protrusion 31 and the other side second protrusion 32 have substantially the same sectional shapes and sectional dimensions. Specifically, a shape in plan view of each of the one side second protrusion 31 and the other side second protrusion 32 is substantially semicircular, and a sectional shape along the height direction of each of the one side second protrusion 31 and the other side second protrusion 32 is substantially rectangular. Further, fillets are applied to both ends of tip ends **31*f* and 32*f* of the respective second protrusions 31 and 32. However, the fillets are not essential. Further, in the present embodiment, each of the one side second protrusion 31 and the other side second protrusion 32 is located on one arbitrary straight line L3 extending in the width direction in the section parallel to the height direction shown in FIG. 3. In other words, the one side second protrusion 31 and the other side second protrusion 32 are provided at the same position in the height direction. However, the positions in the height direction of the one side second protrusion 31 and the other side second protrusion 32 may not be the same. In other words, at least one of the one side second protrusion 31 and the other side second protrusion 32 may not be located on the straight line L3, and the one side second protrusion 31 may be at such a position higher or lower than the other side second protrusion 32 that it does not overlap the straight line L3**, or vice versa.

Further, in the present embodiment, a length in the height direction of the second protrusion pair 30 is substantially the same as a length in the height direction of the first protrusion pair 20 and is substantially the same as a length in the height direction of the parallel surface 15 of the body portion 10. However, the length in the height direction of the second protrusion pair 30 may be shorter than the length in the height direction of the first protrusion pair 20.

A tip end **31*f* of the one side second protrusion 31 is formed in a planar shape to be along the side surface 111 of the groove 110. The tip end 31*f* may be parallel to the side surface 111, or may incline with respect to the side surface 111 as long as the tip end 31*f* is in surface contact with the side surface 111 when the gasket 1 is attached into the groove 110. Further, a tip end 32*f* of the other side second protrusion 32 may be formed in a planar shape to be along the side surface 112 of the groove 110. The tip end 32*f* may be parallel to the side surface 112, or may incline with respect to the side surface 112 as long as the tip end 32*f* is in surface contact with the side surface 112 when the gasket 1 is attached into the groove 110**.

Figure 4:
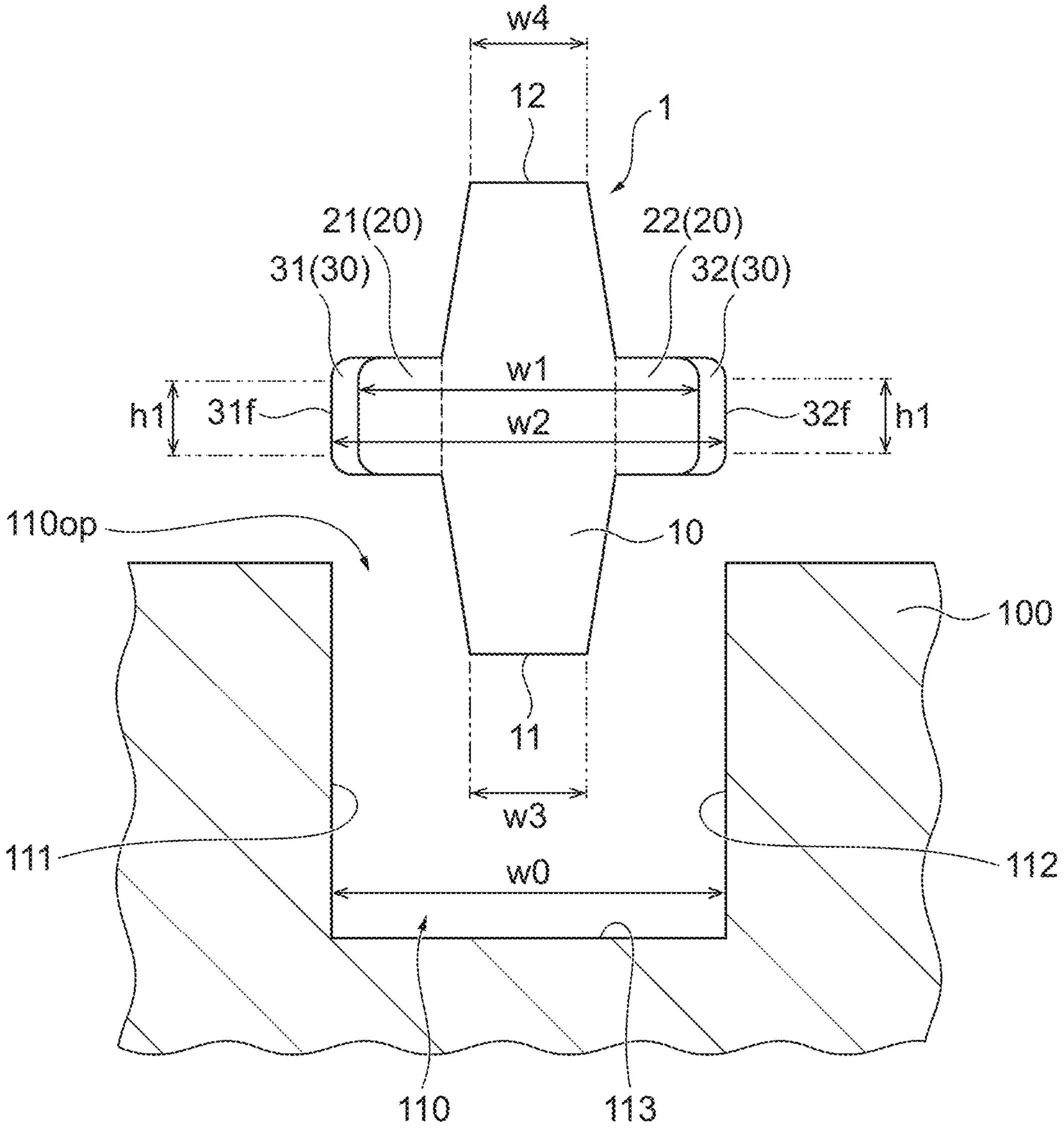
FIG. 4 is a partially cut part end view showing a state before the gasket shown in FIG. 1 is attached to the groove of the first member.

Next, respective widths and the like of the first protrusion pair 20 and the second protrusion pair 30 will be described. FIG. 4 is a partially cut part end view showing a state before the gasket 1 is attached to the groove 110 of the first member 100, and for convenience of explanation, hatching is omitted. As shown in FIG. 4, in the state in which the gasket 1 is not located in the groove 110, a first gasket width W1 from a tip end of the one side first protrusion 21 of the first protrusion pair 20 to a tip end of the other side first protrusion 22 is smaller than a groove width W0 of the groove 110. Further, in the state in which the gasket 1 is not located in the groove 110, a second gasket width W2 from the tip end 31*f* of the one side second protrusion 31 of the second protrusion pair 30 to the tip end 32*f* of the other side second protrusion 32 is larger than the groove width W0. Further, in the present embodiment, a length h1 in the height direction of the respective tip ends 31*f* and 32*f* of the one side second protrusion 31 and the other side second protrusion 32 of the second protrusion pair 30 is smaller than a width W3 of the basal surface 11, and smaller than a width W4 of the top surface 12.

As above, the gasket 1 includes the annular body portion 10 having the basal surface 11 to contact the bottom surface 113 of the groove 110 of the first member 100 and the top surface 12 to contact the second member 200 and extending over the entire circumferential direction of the gasket 1, the first protrusion pair 20 respectively protruding from the body portion 10 toward both the side surfaces 111 and 112 of the groove 110 and extending over the entire circumferential direction, and one or more second protrusion pairs 30 respectively protruding from the first protrusion pair 20 toward both the side surfaces 111 and 112 of the groove. In the gasket 1, each of the one side second protrusion 31 and the other side second protrusion 32 of the second protrusion pair 30 is disposed at the same position in the circumferential direction, and the respective tip ends 31*f* and 32*f* of the second protrusions 31 and 32 of the second protrusion pair 30 are formed in a planar shape to be along the side surfaces of the groove 110. Further, in the gasket 1, the first gasket width W1 from the tip end of the one side first protrusion 21 of the first protrusion pair 20 to the tip end of the other side first protrusion 22 is smaller than the groove width W0 between both the side surfaces 111 and 112 of the groove, and the second gasket width W2 from the tip end 31*f* of the one side second protrusion 31 of the second protrusion pair 30 to the tip end 32*f* of the other side second protrusion 32 is larger than the groove width W0.

Next, one example of use of the gasket 1 like this and effects exhibited in the use will be described.

First, as shown in FIG. 4, the gasket 1 is gripped so that the basal surface 11 of the body portion 10 faces the bottom surface 113 of the groove 110 of the first member 100. In this case, the gasket 1 is not substantially elastically deformed, and the second gasket width W2 is larger than the groove width W0. Next, the gasket 1 is inserted into the groove 110 from the opening 110*op* of the groove 110. At this time, as described above, since the first gasket width W1 is smaller than the groove width W0, it is less susceptible to cause an effect of manufacturing tolerances or the like, and the tip ends of the first protrusion pair 20 are less likely to contact the side surfaces 111 and 112 of the groove 110. Since the first protrusion pair 20 is provided on the entire circumference of the gasket 1, if the tip ends of the first protrusion pair 20 contact the side surfaces 111 and 112, contact areas of the gasket 1 with the side surfaces 111 and 112 become excessively large, and friction can become excessively large. As a result, it becomes difficult to insert the gasket 1 into the groove 110, and attachability is reduced. However, since the tip ends of the first protrusion pair 20 are less likely to contact the side surfaces 111 and 112 of the groove 110 as described above, reduction in attachability is suppressed in advance. Further, since the first gasket width W1 is smaller than the groove width W0, when the gasket 1 is inserted into the groove 110, there is an air space between the tip ends of the first protrusion pair 20 and the side surfaces 111 and 112 as shown in FIG. 2. Therefore, in a process of the insertion, air in the groove 110 flows out of the groove. Accordingly, air is prevented from being sealed in the groove 110 by the gasket 1, and attaching of the gasket 1 into the groove 110 is restrained from being hindered by a repulsive force of the sealed air. In this way, according to the gasket 1, attachability can be improved as compared with the conventional one.

Further as described above, in the present embodiment, the second protrusion pairs 30 are provided at three spots in the entire circumference of the gasket 1, and the above-described second gasket width W2 is larger than the groove width W0. Therefore, when the gasket 1 is inserted into the groove 110, as shown in FIG. 3, the respective second protrusion pairs 30 elastically deform and contract, and the tip ends 31*f* and 32*f* of the second protrusion pairs 30 contact both the side surfaces 111 and 112 of the groove 110. Thus, the gasket 1 attached to the groove 110 is restrained from falling off the groove 110. In other words, the second protrusion pairs 30 act as fall-off prevention protrusions that restrain fall-off of the gasket 1 from the groove. As described above, since the tip ends 31*f* and 32*f* are formed in a planar shape to be along the both the side surfaces 111 and 112, the tip ends 31*f* and 32*f* are in surface contact with both the side surfaces 111 and 112. Accordingly, as compared with, for example, the case in which the tip ends 31*f* and 32*f* are curved surfaces protruding toward both the side surfaces 111 and 112, the contact areas of the tip ends 31*f* and 32*f* and both the side surfaces 111 and 112 increase. Therefore, as compared with the case in which the tip ends 31*f* and 32*f* are the curved surfaces protruding toward both the side surfaces 111 and 112, a large frictional force occurs between both the side surfaces 111 and 112, and the gasket 1 can be more restrained from falling off the groove 110.

Thus, when attaching the gasket 1 to the groove 110 is completed, as shown in FIG. 2 and FIG. 3, the basal surface 11 of the body portion 10 of the gasket 1 contacts the bottom surface 113 of the groove 110. As described above, since the basal surface 11 is formed in a planar shape to be along the bottom surface 113, the basal surface 11 is in surface contact with the bottom surface 113. Accordingly, as compared with the case in which the basal surface 11 is formed to protrude toward the bottom surface 113, for example, a contact area of the basal surface 11 and the bottom surface 113 increases. Therefore, the gasket 1 can be restrained from inclining in the groove 110.

Figure 5:
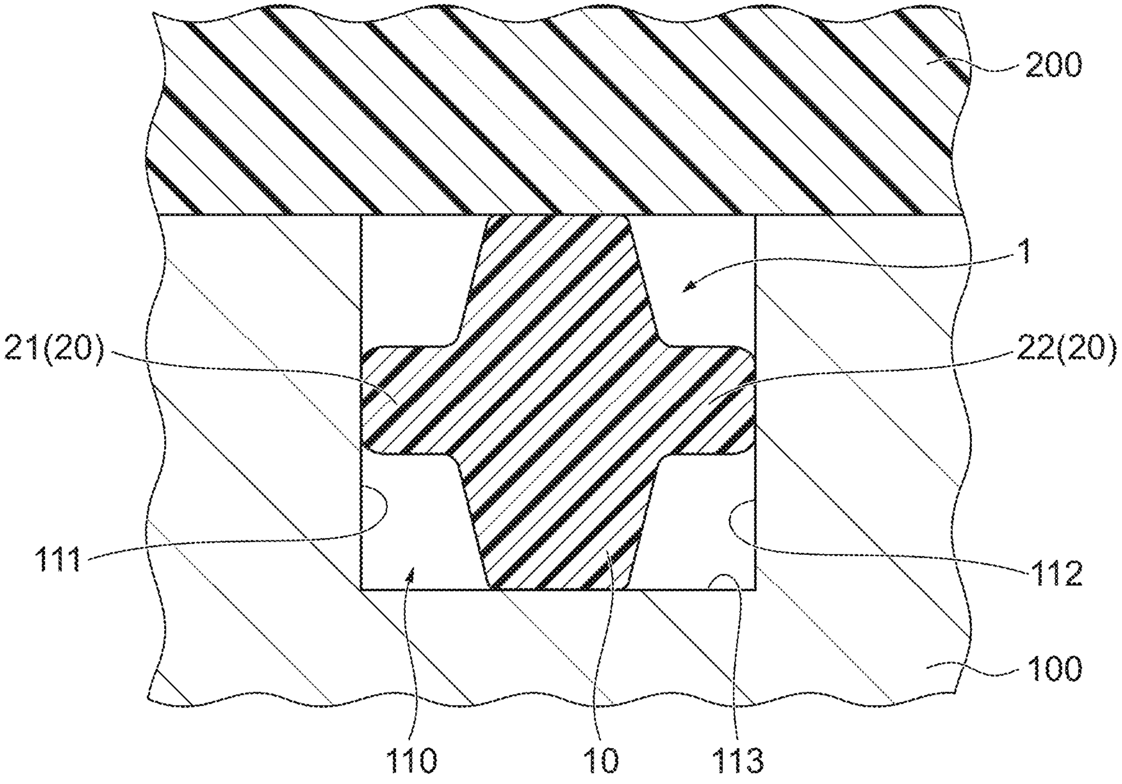
FIG. 5 is a partially cut part end view in line II-II showing a state in which the second member is overlaid on the first member in which the gasket shown in FIG. 1 is attached to the groove.

Thereafter, as shown in FIG. 2 and FIG. 3, the surface 201 of the second member 200 is brought into contact with the top surface 12 of the gasket 1 attached to the groove 110. Thereafter, as shown in FIG. 5, the second member 200 is overlaid while being pressed toward the first member 100, the gasket 1 is compressed by the first member 100 and the second member 200. Thus, the gasket 1 closely contacts each of the bottom surface 113 of the first member 100 and the surface 201 of the second member 200 by a repulsive force to the compression, and the gap between the first member 100 and the second member 200 is sealed.

Incidentally, since the basal surface 11 is formed in a planar shape to be along the bottom surface 113 as described above, the contact area of the basal surface 11 and the bottom surface 113 increases. Therefore, when the second member 200 is overlaid, stress can be restrained from being locally concentrated in a vicinity of the basal surface 11. Further, since the top surface 12 is formed in a planar shape to be along the surface 201 of the second member 200 as described above, the top surface 12 and the surface 201 are in surface contact with each other. Therefore, as compared with the case in which the top surface 12 is the curved surface that protrudes toward the surface 201 of the second member 200, for example, a contact area of the top surface 12 and the surface 201 increases. Therefore, when the second member 200 is overlaid, stress can be restrained from being locally concentrated in a vicinity of the top surface 12.

Further, in the gasket 1, the first protrusion pair 20 protrudes toward both the side surfaces 111 and 112 of the groove 110 from the body portion 10. According to the configuration like this, even if the gasket 1 starts to incline to either side of the side surfaces 111 and 112 when the second member 200 is overlaid, the first protrusion pair 20 abuts on the side surfaces of the groove 110 before the body portion 10 abuts on the side surfaces of the groove. Therefore, the gasket 1 can be restrained from inclining in a process of overlaying the second member 200. Thus, the first protrusion pair 20 acts as the fall-off prevention protrusions that restrain fall of the gasket 1. Further, since the first protrusion pair 20 protrudes toward both the side surfaces 111 and 112 of the groove from the body portion 10, the gasket 1 becomes thick and rigidity of the gasket 1 increases. Therefore, the gasket 1 can be restrained from bending in the process of overlaying the second member 200.

Further, according to the gasket 1, effects as follows can be exhibited in addition to the above-described effects.

As described above, since the first protrusion pair 20 is continuously formed over the entire circumferential direction, it is avoided that the shape of the gasket is complicated as compared with the case in which the first protrusion pair is intermittently formed in the circumferential direction.

As described above, in the present embodiment, each of the one side second protrusion 31 and the other side second protrusion 32 is provided at the same position in the height direction of the gasket 1. According to the configuration like this, meandering deformation of the gasket 1 along the height direction in the groove 110 can be restrained, as compared with the case in which the positions in the height direction of the one side second protrusion 31 and the other side second protrusion 32 are not the same.

Figure 6:
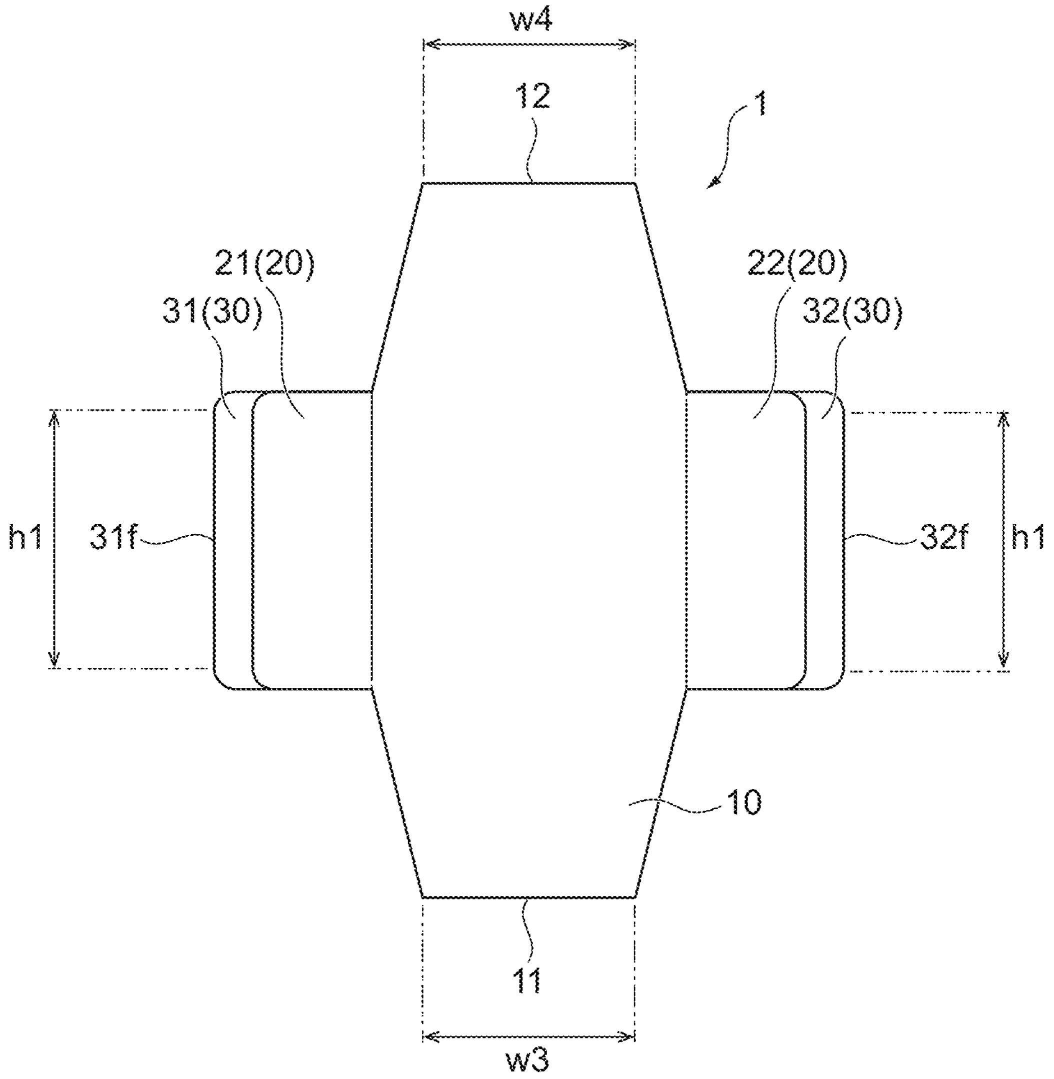
FIG. 6 is a sectional view showing a modification of the gasket according to the first embodiment, which is a sectional view showing a view before the gasket is attached to the groove.

For example, in the above-described first embodiment, the example is descried, in which the respective lengths h1 in the height direction of the tip ends 31*f* and 32*f* of the one side second protrusion 31 and the other side second protrusion 32 of the second protrusion pair 30 are smaller than the width W3 of the basal surface 11, and smaller than the width W4 of the top surface 12. However, as shown in FIG. 6, for example, in at least one of the tip ends 31*f* and 32*f* of the one side second protrusion 31 and the other side second protrusion 32 of the second protrusion pair 30, the length h1 in the height direction may be equal to or larger than the width W3 of the basal surface 11, and may be equal to or larger than the width W4 of the top surface 12. According to the configuration like this, as compared to the case in which the length h1 in the height direction of the tip ends 31*f* and 32*f* is smaller than the width W3 of the basal surface 11 and smaller than the width W4 of the top surface 12, the contact surface with the side surface 111 and the side surface 112 of the groove 110 increases. Therefore, fall-off of the gasket 1 from the groove 110 can be restrained more effectively.

Second Embodiment

Figure 7:
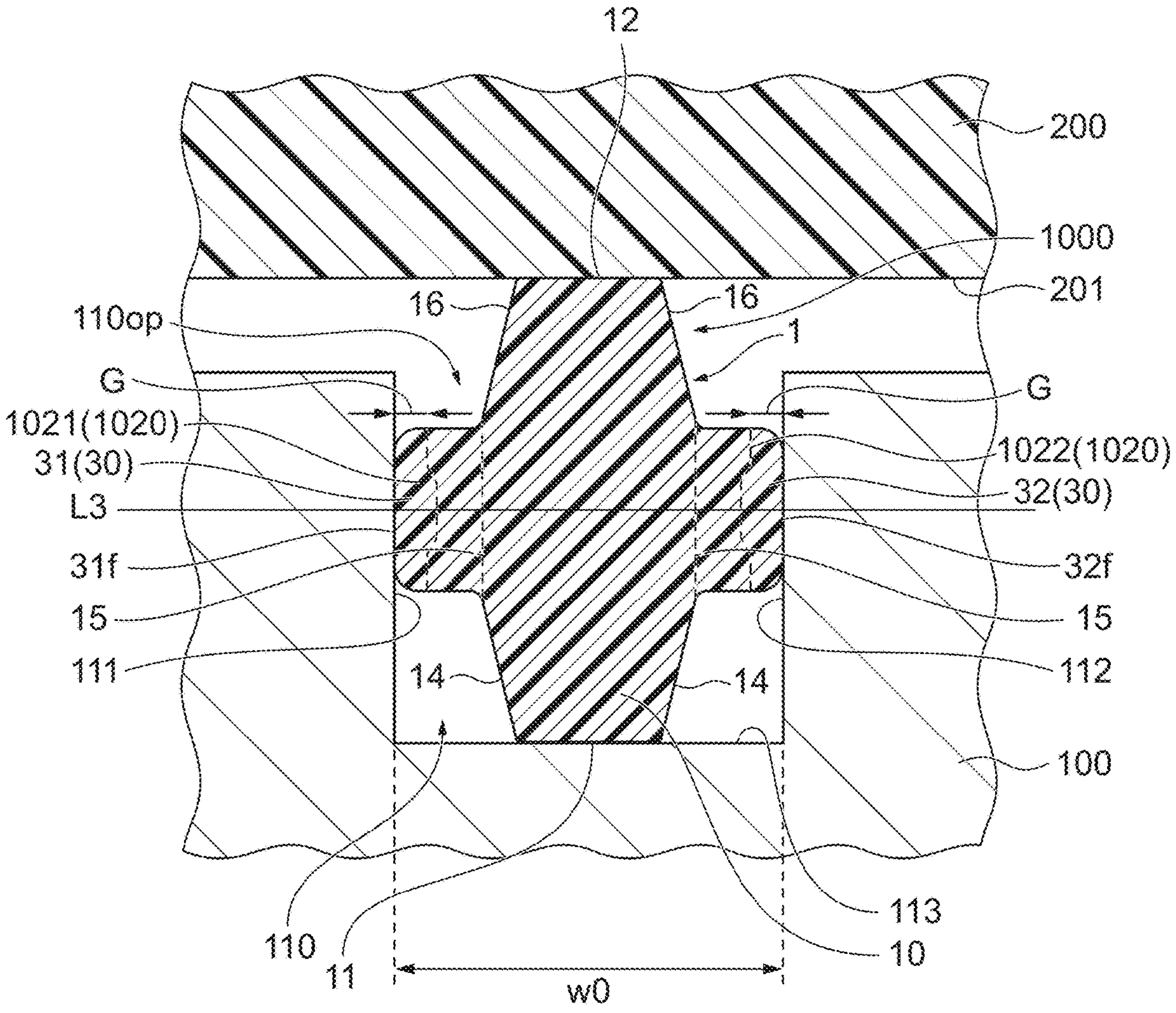
FIG. 7 is a sectional view showing a state in which a gasket according to a second embodiment of the present disclosure is attached to a groove of a first member, similarly to FIG. 3.
Figure 8:
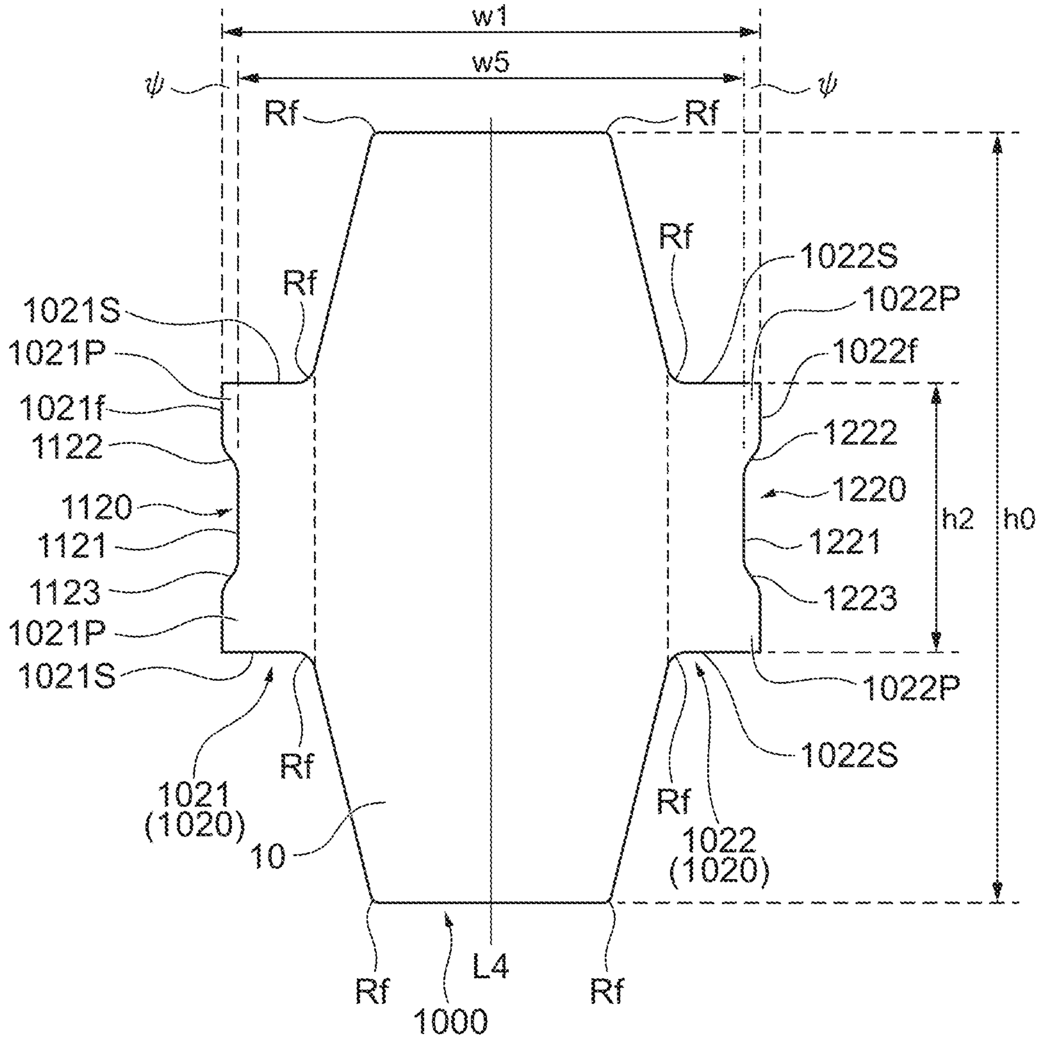
FIG. 8 is a cut part end view showing a body portion and a first protrusion pair of the gasket shown in FIG. 7.

Next, a second embodiment will be described. FIG. 7 is a sectional view showing a state in which a gasket according to the present embodiment is attached to a groove of a first member similarly to FIG. 3. In other words, FIG. 7 is a view showing a section perpendicular to a circumferential direction to a gasket 1000 (section parallel to a height direction). FIG. 8 is a cut part end view showing a body portion and a first protrusion pair of the gasket according to the present embodiment. Note that in FIG. 8, hatching is omitted for convenience. As shown in FIG. 7 and FIG. 8, the gasket 1000 according to the present embodiment has a configuration similar to the gasket 1 of the first embodiment except for a configuration of the first protrusion pair. Accordingly, for the gasket 1000, only the point relating to a first protrusion pair 1020 is described, and the other components are assigned with similar reference signs to those in the first embodiment and explanation thereof is omitted.

As shown in FIG. 7 and FIG. 8, the gasket 1000 is formed so that the section perpendicular to the circumferential direction (section parallel to the height direction) is linearly symmetrical. The first protrusion pair 1020 of the gasket 1000 is located in a substantially center in the height direction of the gasket 1000. The first protrusion pair 1020 has one side first protrusion 1021 located on a side surface 111 side of a groove 110 of a first member 100 with respect to a body portion 10, and another side first protrusion 1022 located on a side surface 112 side of the groove 110. The one side first protrusion 1021 and the other side first protrusion 1022 are formed to be linearly symmetrical with respect to a line L4 extending in the height direction in a center of the body portion 10 in a width direction. Further, the one side first protrusion 1021 and the other side first protrusion 1022 are both located on one arbitrary straight line L3 extending in the width direction. In the present embodiment, the straight line L3 is defined as a line passing through a center of each of the one side first protrusion 1021 and the other side first protrusion 1022 in the height direction. Each of the one side first protrusion 1021 and the other side first protrusion 1022 is formed to be linearly symmetrical with respect to the straight line L3.

As shown in FIG. 7 and FIG. 8, the one side first protrusion 1021 is formed in a substantially rectangle in sectional view perpendicular to the circumferential direction. The one side first protrusion 1021 includes a pair of side surfaces 1021S extending perpendicularly to a parallel surface 15 (that is, parallel to the width direction) toward the side surface 111 side of the groove 110 from the parallel surface 15 on one side of the body portion 10, and a tip end (tip end surface) 1021*f* extending perpendicularly to the pair of side surfaces 1021S (that is, parallel to the height direction). One of the pair of side surfaces 1021S connects an end portion on a second member 200 side, of the tip end 1021*f*, and an end portion on the second member 200 side of the parallel surface 15 of the body portion 10. Further, another one of the pair of side surfaces 1021S connects an end portion on a bottom surface 113 side of the groove 110 in the tip end 1021*f*, and an end portion on the bottom surface 113 side in the parallel surface 15 of the body portion 10. In the present embodiment, connecting portions between the pair of side surfaces 1021S and the body portion 10 are fillets Rf that are rounded. However, rounding the connecting portions like this is not essential.

Further, in the present embodiment, connecting portions between a top surface 12 and a pair of top surface side inclined surfaces 16 in the body portion 10, and connecting portions between a basal surface 11 and a pair of basal surface side inclined surfaces 14 in the body portion 10 are also fillets Rf. However, rounding the connecting portions like this is not essential. On the other hand, in the first embodiment, the connecting portions between the top surface 12 and the pair of top surface side inclined surfaces 16 in the body portion 10, and the connecting portions between the basal surface 11 and the pair of basal surface side inclined surfaces 14 in the body portion 10 may be rounded.

In a substantially center in the height direction of the tip end 1021*f*, a recessed part 1120 recessed to the body portion 10 side is formed. Specifically, the recessed part 1120 is formed linearly symmetrical with respect to the straight line L3, and is a space defined by a curved surface 1122 located on the second member 200 side with respect to the straight line L3, a curved surface 1123 located on the bottom surface 113 side of the groove 110 with respect to the straight line L3, and a bottom surface 1121 connecting respective end portions on the body portion 10 side of the curved surface 1122 and the curved surface 1123. The bottom surface 1121 extends parallel to the height direction. By the configuration like this, at the one side first protrusion 1021, a pair of protrusions 1021P protruding closer to the side surface 111 than the bottom surface 1121 are formed respectively on the second member 200 side and the bottom surface 113 side of the groove 110 with the bottom surface 1121 as a reference.

The other side first protrusion 1022 is formed in a substantially rectangle in sectional view perpendicular to the circumferential direction. The other side first protrusion 1022 includes a pair of side surfaces 1022S extending perpendicularly to a parallel surface 15 toward a side surface 112 side of the groove 110 from the parallel surface 15 on the other side of the body portion 10, and a tip end (tip end surface) 1022*f* extending perpendicularly to the pair of side surfaces 1022S (that is, parallel to the height direction). One of the pair of side surfaces 1022S connects an end portion on the second member 200 side, of the tip end 1022*f*, and an end portion on the second member 200 side of the parallel surface 15 of the body portion 10. Further, another one of the pair of side surfaces 1022S connects an end portion on the bottom surface 113 side of the groove 110 in the tip end 1022*f*, and an end portion on the bottom surface 113 side in the parallel surface 15 of the body portion 10. In the present embodiment, connecting portions between the pair of side surfaces 1022S and the body portion 10 are fillets Rf that are rounded.

Note that rounding the connecting portions between the pair of side surfaces 1021S and the body portion 10 and the connecting portions between the pair of side surfaces 1022S and the body portion 10 is not essential. On the other hand, in the first embodiment, the connecting portions between the first protrusion pair 20 and the body portion 10 may be rounded.

In a center in the height direction of the tip end 1022*f*, a recessed part 1220 recessed to the body portion 10 side is formed. Specifically, the recessed part 1220 is formed linearly symmetrical with respect to the straight line L3, and is a space defined by a curved surface 1222 located on the second member 200 side with respect to the straight line L3, a curved surface 1223 located on the bottom surface 113 side of the groove 110 with respect to the straight line L3, and a bottom surface 1221 connecting respective end portions on the body portion 10 side of the curved surface 1222 and the curved surface 1223. The bottom surface 1221 extends parallel to the height direction. By the configuration like this, at the other side first protrusion 1022, a pair of protrusions 1022P protruding the side surface 112 side from the bottom surface 1221 are formed respectively on the second member 200 side and the bottom surface 113 side with the bottom surface 1221 as a reference. In the present embodiment, the recessed part 1220 is linearly symmetrical with the recessed part 1120 with the line L4 extending in the height direction in the center of the body portion 10 in the width direction as a reference. However, it is not essential that the recessed part 1220 is symmetrical with the recessed part 1120.

When the gasket 1000 is positioned in the groove 110 of the first member 100, and is not pressed by the second member 200, gaps G are formed respectively between the tip end 1021*f* of the one side first protrusion 1021 and the side surface 111 of the groove 110, and between the tip end 1022*f* of the other side first protrusion 1022 and the side surface 112 of the groove 110. A total "G+G" of the respective gaps G (total of lengths in the width direction of the respective gaps G) can be represented by formula (1) below using a groove width w0, and a first gasket width w1 from the tip end 1021*f* of the one side first protrusion 1021 to the tip end 1022*f* of the other side first protrusion 1022.

$$G+G=w0-w1 \tag{1}$$

The total "G+G" of the respective gaps G is not particularly limited, but is equal to or less than 1.0 mm in the present embodiment. Here, a length in the width direction of the gap G between the tip end 1021*f* of the one side first protrusion 1021 and the side surface 111 of the groove 110, and a length in the width direction of the gap G between the tip end 1022*f* of the other side first protrusion 1022 and the side surface 112 of the groove 110 may be the same or different. Note that in the first embodiment, a total of gaps between the tip end of the one side first protrusion 21 and the side surface 111 of the groove 110, and between the tip end of the other side first protrusion 22 and the side surface 112 of the groove 110 may be similarly equal to or less than 1.0 mm.

Further, when a height of the body portion 10 (height of the gasket 1000) is h0, and a height of the first protrusion pair 20 (height of the one side protrusion 1021 and the other side first protrusion 1022) is h2, a ratio h2/h0 of the height h2 of the first protrusion pair 20 to the height h0 of the body portion 10 is not particularly limited, but in the present embodiment, is $$0.25 < h2/h0 < 0.5.$$

Note that the height h2 is also a height of the parallel surface 15 of the body portion 10.

Further, in the present embodiment, the height h2 of the first protrusion pair 20 is longer than each of the width w3 (see FIG. 3) of the basal surface 11 of the body portion 10 and the width w4 (see FIG. 3) of the top surface 12. However, the height h2 may be the same as the width w3 and the width w4 or shorter than the width w3 and the width w4. However, if the height h2 is longer than the width w3 and the width w4, it is easy to form the recessed part 1120 and the recessed part 1220.

Further, when a width between the bottom surface 1121 of the recessed part 1120 of the one side first protrusion 1021 and the bottom surface 1221 of the recessed part 1220 of the other side first protrusion 1022 is w5, each of recesses ψ of the recessed part 1120 and the recessed part 1220 can be represented by formula (2) below by using the width w5 and the first gasket width w1.

$$\psi = (w1 - w5)/2 \quad (2)$$

The recess ψ is a distance from a most recessed portion (bottom surface 1121) of the recessed part 1120 to the tip end 1021*f* of the one side first protrusion 1021, and is a distance from a most recessed portion (bottom surface 1221) of the recessed part 1220 to the tip end 1022*f* of the other side first protrusion 1022, in the width direction of the gasket 1000. A dimension of the recess ψ is not particularly limited, but is equal to or less than 0.5 mm in the present embodiment.

When the gasket 1000 is positioned in the groove 110, and the gasket 1000 is pressed in the height direction by the second member 200, the gasket 1000 deforms in the width direction and is collapsed, the tip end 1021*f* of the first protrusion pair 1020 presses the side surface 111 of the groove 110, and the tip end 1022*f* of the first protrusion pair 1020 presses the side surface 112 of the groove 110. With this, the gasket 1000 receives reaction forces from the side surfaces 111 and 112. Incidentally, in the gasket 1 of the first embodiment, recessed parts such as the recessed parts 1120 and 1220 are not formed at the first protrusion pair 20, and therefore, when the flat tip ends of the first protrusion pair 20 contact the side surfaces 111 and 112 of the groove 110 by being pressed by the second member 200, the flat tip ends of the first protrusion pair 20 are only compressed in the width direction with respect to the reaction forces of the side surfaces 111 and 112, so that compression stress and the reaction forces of the side surfaces 111 and 112 tend to be large (see FIG. 5). That is to say, the gasket 1 of the first embodiment is strongly pressed in the height direction by the second member 200, and in the width direction by the side surfaces 111 and 112, respectively. As a result, the gasket 1 may incline in the groove 110 to escape from strong forces from the height direction and the width direction. In contrast, in the gasket 1000 of the present embodiment, as shown in FIG. 8, the protrusions 1021P and 1022P that are formed as the recessed parts 1120 and 1220 are formed are present at the tip ends 1021*f* and 1022*f* of the first protrusion pair 1020. Therefore, when the tip ends 1021*f* and 1022*f* of the first protrusion pair 1020 press the side surfaces 111 and 112 with pressing from the second member 200, the protrusions 1021P and 1022P deform, and the pressing force which the first protrusion pair 1020 exerts on the side surfaces 111 and 112 is reduced. As a result, reaction forces acting on the gasket 1000 from the side surfaces 111 and 112 are reduced. In other words, in the gasket 1000, a force acting on the gasket is reduced when it is pressed by the second member 200, and therefore the gasket can be more restrained from inclining in the groove 110 when pressed by the second member 200 as compared with the gasket 1 of the first embodiment. Further, as the reaction forces acting on the gasket 1000 from the side surfaces 111 and 112 of the groove 110 are reduced, the reaction force which the gasket 1000 exerts on the second member 200 can be reduced. As a result of the reaction force of the gasket 1000 to the second member 200 being reduced in this way, even when the second member 200 has a relatively low strength due to being formed of a resin or formed to be thin, for example, an effect of the reaction force which the second member 200 receives from the gasket 1000 can also be reduced.

Further, the gasket 1000 has a substantially similar configuration to the gasket 1 of the first embodiment, except for the configuration of the first protrusion pair 1020 as described above. Therefore, according to the gasket 1000, it is possible to obtain similar effects to the effects obtained by the aforementioned gasket 1, except that the gasket is more restrained from inclining in the groove 110 when pressed by the second member 200 as compared with the gasket 1 of the first embodiment.

Incidentally, in the gasket 1000, in the first protrusion pair 1020, there are a first pair of protrusion portions composed of the protrusion 1021P on the second member 200 side of the one side first protrusion 1021, and the protrusion 1022P on the second member 200 side of the other side first protrusion 1022, and a second pair of protrusion portions composed of the protrusion 1021P on the bottom surface 113 side of the one side first protrusion 1021 and the protrusion 1022P on the bottom surface 113 side of the other side first protrusion 1022, and since the first pair and the second pair are connected in the height direction, when a mold is to be removed in the height direction at the time of molding of the gasket 1000, one of the first pair and the second pair causes unreasonable removal. However, in the gasket 1000 of the present embodiment, as described above, the distance from the most recessed portion of the recessed part to the tip end of the first protrusion pair is suppressed to 0.5 mm or less, in the width direction of the gasket. According to the configuration like this, even if unreasonable removal is caused as described above, loss of moldability can be effectively restrained, because the length by which the first pair and the second pair protrude is short.

Further, in the present embodiment, as described above, the total "G+G" of the respective gaps G is equal to or less than 1.0 mm. According to the configuration like this, each of a space between the tip end 1021*f* of the one side first protrusion 1021 and the side surface 111 of the groove 110, and a space between the tip end 1022*f* of the other side first protrusion 1022 and the side surface 112 of the groove 110 is relatively narrow, and therefore it is possible to enhance an effect of preventing the gasket from falling down by the first protrusion pair 1020. Further, since the total "G+G" of the respective gaps G is equal to or less than 1.0 mm, the first protrusion pair 1020 can be prevented from non-contacting the side surfaces 111 and 112 of the groove 110 when the gasket 1000 is pressed in the height direction by the second member 200. In other words, as a result of the total "G+G" of the respective gaps G being equal to or less than 1.0 mm, the first protrusion pair 1020 can more reliably press the side surfaces 111 and 112 of the groove 110 when the gasket 1000 is pressed by the second member 200, and therefore, it is possible to bring the gasket 1000 and the first member 100 into close contact with each other in the width direction more reliably.

Further, in the present embodiment, as described above, the ratio h2/h0 of the height h2 of the first protrusion pair 20 to the height h0 of the body portion 10 is $$0.25 < h2/h0 < 0.5.$$

If 0.25<h2/h0 is satisfied, a contact surface area between the tip end 1021*f* of the first protrusion pair 1020 and the side surface 111 of the groove 110, or a contact area between the tip end 1022*f* of the first protrusion pair 1020 and the side surface 112 of the groove 110 is ensured to be large to some extent when the gasket 1000 is to incline in the groove 110, and therefore, it is possible to prevent the gasket 1000 from falling down in the groove 110 more effectively. Incidentally, a sectional area (see FIG. 2, FIG. 3, and FIG. 7) of the gasket perpendicular to the circumferential direction to a sectional area of the groove 110 perpendicular to the circumferential direction is defined as a filling factor for convenience. If h2/h0<0.5 is satisfied, the above-described filling factor is restrained from exceeding 100%, as a result of which, when the gasket 1000 is pressed in the height direction by the second member 200, the gasket 1000 is restrained from being excessively compressed to cause cracking, or the repulsive force of the gasket 1000 is restrained from excessively increasing.

Note that the present embodiment is not limited to the above-described example. For example, in the above-described example of the present embodiment, the recessed parts are formed in both the one side first protrusion 1021 and the other side first protrusion 1022, but the recessed part may be formed in only one of the one side first protrusion 1021 and the other side first protrusion 1022.

Figure 9:
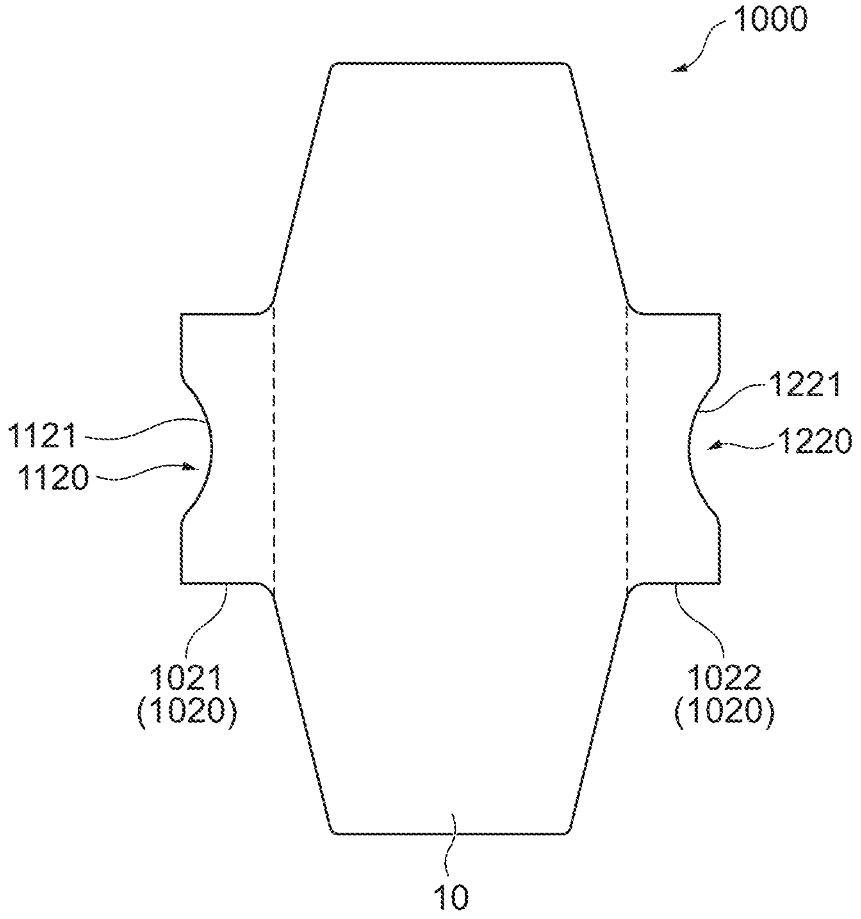
FIG. 9 is a cut part end view showing a first modification of the gasket shown in FIG. 7, similarly to FIG. 8.

Further, in the above-described example of the present embodiment, the example in which the bottom surfaces 1121 and 1221 defining the recessed parts 1120 and 1220 are planes parallel to the height direction is described, but the bottom surfaces 1121 and 1221 are not limited to this. For example, as shown in FIG. 9, bottom surfaces 1121 and 1221 may be surfaces that sink toward a body portion 10 side from both end portions in a height direction of recessed parts 1120 and 1220 to center portions. That is, in this example, the bottom surfaces 1121 and 1221 are convex toward the body portion 10 side, and are not planes parallel to the height direction.

Further, in the above-described example of the present embodiment, the example is described, in which the pair of side surfaces 1021S of the one side first protrusion 1021 and the pair of side surfaces 1022S of the other side first protrusion 1022 extend perpendicularly to the parallel surfaces 15 of the body portion 10. However, at least one of the pair of side surfaces 1021S and the pair of side surfaces 1022S may not extend parallel to the parallel surfaces 15. Specifically, a modification as shown in FIG. 10 may be configured.

Figure 10:
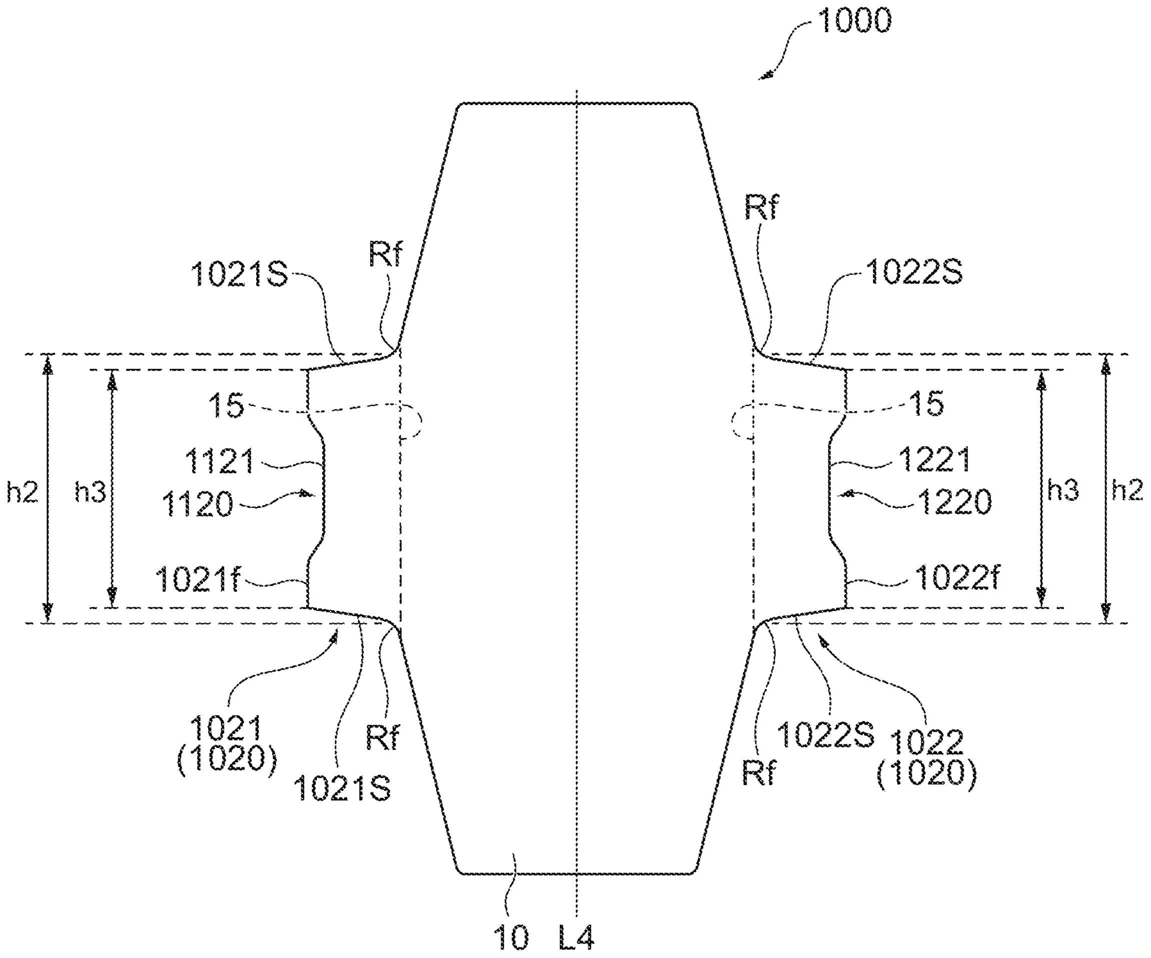
FIG. 10 is a cut part end view showing a second modification of the gasket shown in FIG. 7, similarly to FIG. 8.

In the modification in FIG. 10, a pair of side surfaces 1021S of one side first protrusion 1021 separate from each other as progress toward a body portion 10 from a tip end **1021*f* of the one side first protrusion 1021 in a width direction and connect to a parallel surface 15 of the body portion 10 via fillets Rf. In other words, the one side first protrusion 1021 is formed into a tapered shape that enlarges as progresses toward the body portion 10 in sectional view perpendicular to a circumferential direction of a gasket 1000. Accordingly, in this modification, a height of a connecting portion of the pair of side surfaces 1021S of the one side first protrusion 1021 and the body portion 10, that is, a height h2 of the parallel surface 15 is larger than a height h3 of a tip end 1021*f* of the one side first protrusion 1021. As shown in FIG. 10, in this modification, another side first protrusion 1022 is formed to be linearly symmetrical with the one side first protrusion 1021 with respect to a line L4 extending in the height direction in a center of the body portion 10 in the width direction. Therefore, the other side first protrusion 1022 is formed in a tapered shape that enlarges as progresses toward the body portion 10 in sectional view perpendicular to the circumferential direction of the gasket 1000. Further, a height of a connecting portion between a pair of side surfaces 1022S of the other side first protrusion 1022 and the body portion 10, that is, the height h2 of the parallel surface 15 is larger than a height h3 of a tip end 1022*f* of the other side first protrusion 1022. According to the modification in FIG. 10 like this, a root (connecting portion with the body portion 10) of each of the one side first protrusion 1021 and the other side first protrusion 1022 is wider than the tip end, and therefore, strength of the above-described root increases. Therefore, when the gasket in the groove 110 is pressed by the second member 200, an effect of surface pressure acting on the gasket from the side surface 111 and the side surface 112 of the groove 110 is reduced. Note that in the modification in FIG. 10, the example in which both the one side first protrusion 1021 and the other side first protrusion 1022 are formed in the tapered shape is described, but only one of the one side first protrusion 1021 and the other side first protrusion 1022 may be formed in the tapered shape. Further, the modification in FIG. 10 (that is, a mode in which at least one of the one side first protrusion and the other side first protrusion is formed in the tapered shape as described above) may be applied to the gasket 1** of the first embodiment.

The present disclosure is described thus far with the above-described embodiments as examples, but the present disclosure is not limited to them.

For example, the one side first protrusion 21 and the other side first protrusion 22 may have sectional shapes and sectional dimensions that are different from each other. Further, the above-described sectional shapes are not limited to rectangles. For example, the sectional shapes may be trapezoids, parallelograms, or polygons equal to or larger than pentagons, or may be shapes based on curved surfaces such as semi-elliptical shapes.

Further, the one side second protrusion 31 and the other side second protrusion 32 may have sectional shapes and sectional dimensions that are different from each other. Further, the shapes in plan view of the one side second protrusion 31 and the other side second protrusion 32 are not limited to semicircular shapes, but may be rectangles, for example. Furthermore, sectional shapes thereof along the height direction are not limited to rectangles, but may be, for example, trapezoids, parallelograms, and polygons equal to or larger than pentagons, or may cured surface shapes except for the tip ends.

Further, in the above-described embodiment, the example in which the three second protrusion pairs 30 are disposed at regular intervals in the circumferential direction of the gasket 1 is described. However, one or more second protrusion pairs 30 can be provided, and two, four, five or more second protrusion pairs 30 may be provided at regular intervals along the circumferential direction. Further, when a plurality of second protrusion pairs 30 are provided along the circumferential direction, these protrusion pairs 30 may not be disposed at regular intervals.

The invention claimed is:

1. A gasket in an annular shape to seal a gap between a first member in which an annular groove is formed and a second member to be overlaid on the first member to close an opening of the groove, the gasket comprising:

a body portion in an annular shape having a basal surface to contact a bottom surface of the groove and a top surface to contact the second member and extending over an entire circumferential direction of the gasket;

a first protrusion pair protruding from the body portion respectively toward both side surfaces in a radial direction of the groove and extending over the entire circumferential direction; and one or more second protrusion pairs protruding from the first protrusion pair respectively toward both the side surfaces of the groove, wherein:

respective protrusions of the second protrusion pair are disposed at a same position in the circumferential direction, and tip ends of the respective protrusions are formed in a planar shape to be along the side surfaces of the groove, and a first gasket width from a tip end of one protrusion of the first protrusion pair to a tip end of another protrusion is smaller than a groove width between both the side surfaces of the groove, and a second gasket width from a tip end of one protrusion of the second protrusion pair to a tip end of another protrusion is larger than the groove width, wherein a recessed part recessed to a body portion side and extending over the entire circumferential direction of the gasket is formed at the tip end of at least one protrusion of the first protrusion pair, and wherein the recessed part is formed on a central portion of the protrusion of the first protrusion pair in a cross-section taken along the height direction of the gasket.

2. The gasket according to claim 1, wherein the respective protrusions of the second protrusion pair are provided at a same position in the height direction of the gasket.

3. The gasket according to claim 1, wherein in a width direction of the gasket, a distance from a most recessed portion of the recessed part to the tip end is equal to or less than 0.5 mm.

4. The gasket according to claim 1, wherein in sectional view perpendicular to the circumferential direction of the gasket, at least one protrusion of the first protrusion pair is formed in a tapered shape that enlarges as progresses toward the body portion.

5. The gasket according to claim 1, wherein:

the basal surface of the body portion is formed in a planar shape to be along the bottom surface of the groove, and a length of the tip end of at least one protrusion of the second protrusion pair in the height direction of the gasket is equal to or larger than a width of the basal surface.

6. The gasket according to claim 1, wherein:

the top surface of the body portion is formed in a planar shape to be along a surface of the second member that is to abut on the top surface, and a length of the tip end of at least one protrusion of the second protrusion pair in the height direction of the gasket is equal to or larger than a width of the top surface.

7. The gasket according to claim 1, wherein the gasket is formed such that a cross-section along the height direction of the gasket is line-symmetrical.

8. The gasket according to claim 1, wherein the length in the height direction of each tip of the second protrusion pair is substantially the same as the length in the height direction of each tip of the first protrusion pair.

* * * * *